(No Model.) 2 Sheets—Sheet 1.
J. QUINN, Jr. & L. V. MOULTON.
MACHINE FOR MAKING CRAYONS, &c.
No. 452,350. Patented May 12, 1891.
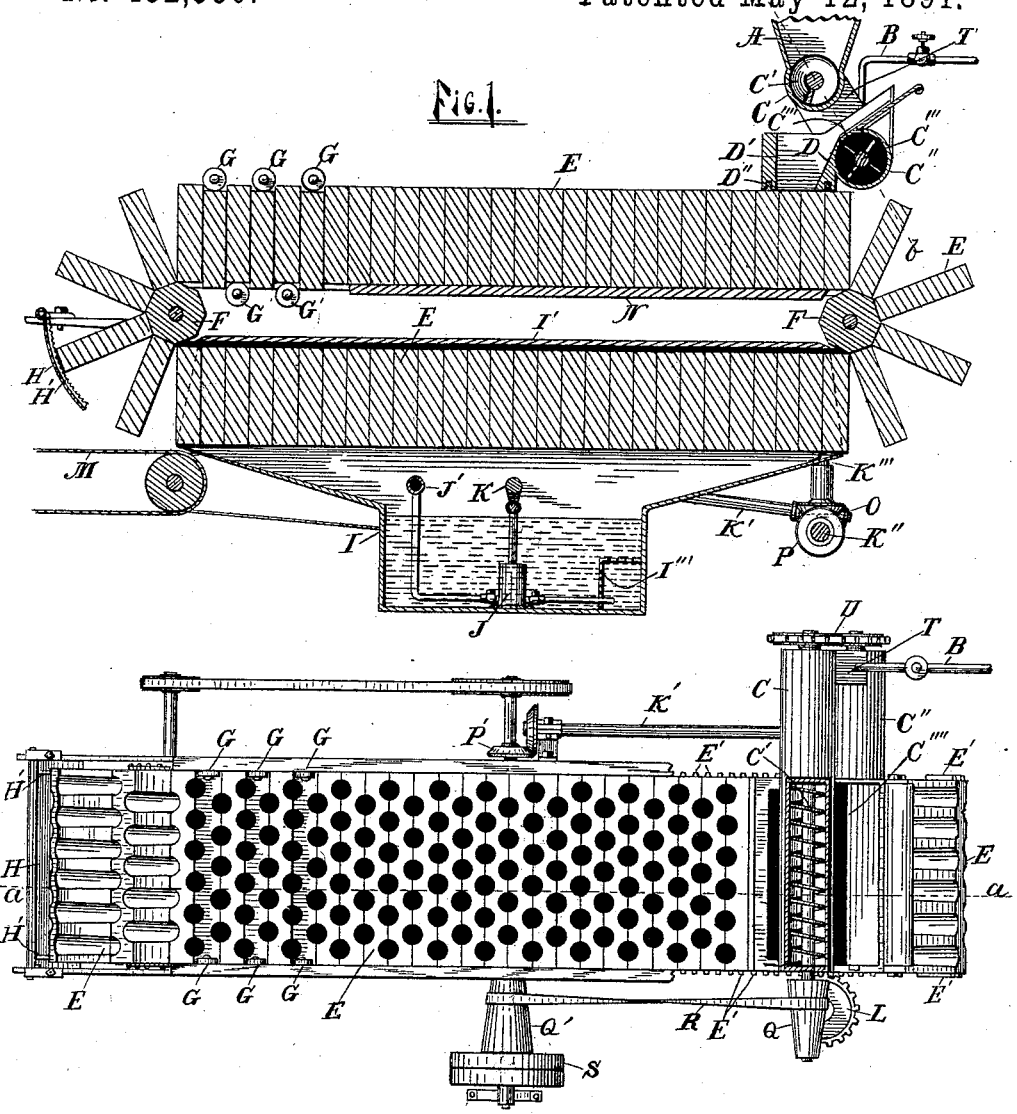
WITNESSES:
INVENTORS
James Quinn Jr.
Luther V. Moulton
BY
Moulton & Rogers.
ATTORNEYS

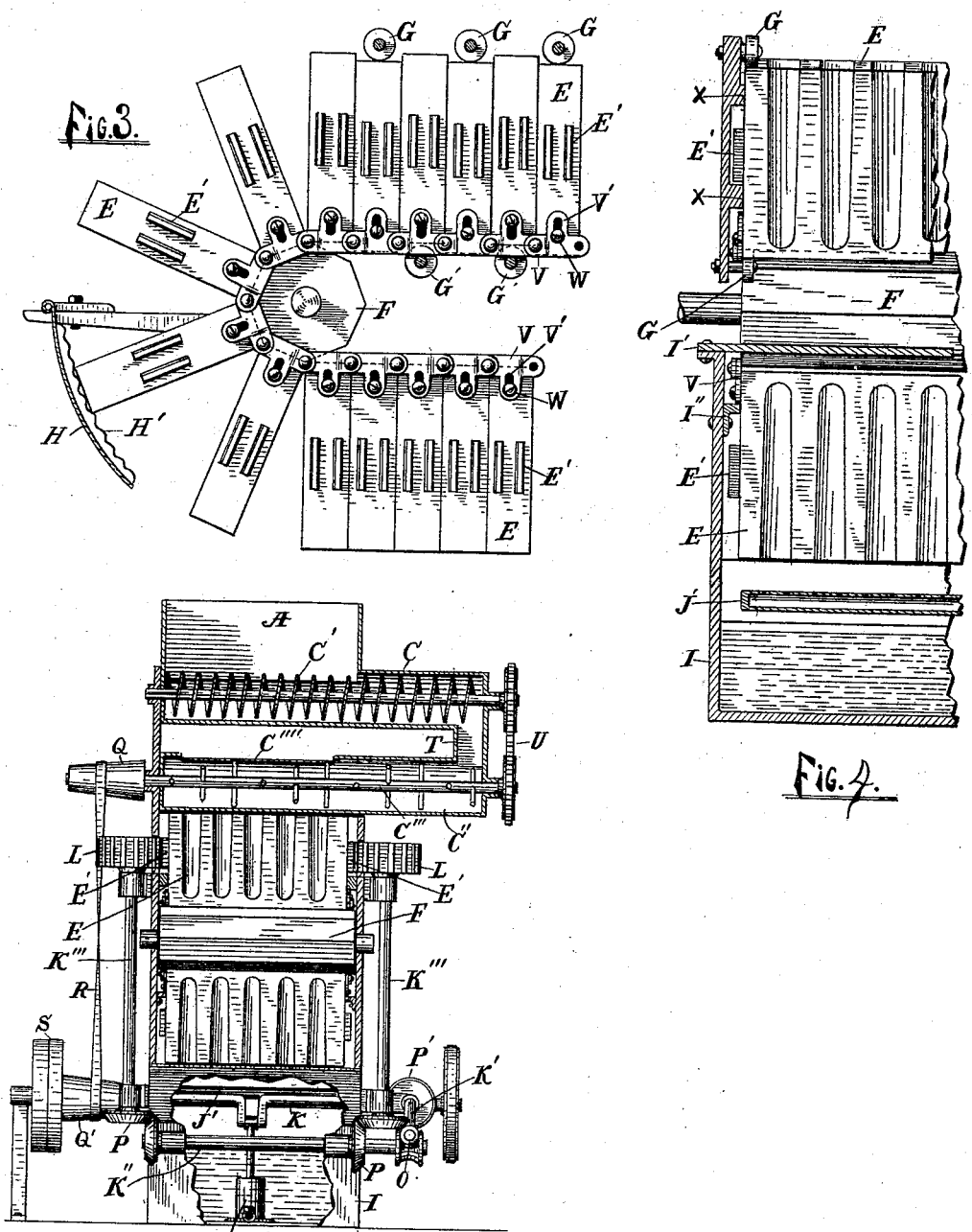

UNITED STATES PATENT OFFICE.

JAMES QUINN, JR., AND LUTHER V. MOULTON, OF GRAND RAPIDS, MICHIGAN.

MACHINE FOR MAKING CRAYONS, &c.

SPECIFICATION forming part of Letters Patent No. 452,350, dated May 12, 1891.

Application filed February 20, 1891. Serial No. 382,258. (No model.)

*To all whom it may concern:*

Be it known that we, JAMES QUINN, Jr., and LUTHER V. MOULTON, both being citizens of the United States, residing at Grand Rapids, in the county of Kent and State of Michigan, have invented certain new and useful Improvements in Machines for Making Crayons, &c; and we do hereby declare the following to be a full, clear, and exact description of the invention, such as will enable others skilled in the art to which it appertains to make and use the same.

Our invention relates to improvements in machines for molding school crayons, carpenters' chalks, and other like articles, and its object is to provide a machine that will automatically and continuously perform the process of mixing the stock, filling, emptying, cleaning, and oiling the molds without the intervention of hand labor.

In the accompanying drawings, Figure 1 is a longitudinal vertical section on the line *a a* of Fig. 2; Fig. 2, a plan view of the device; Fig. 3, an enlarged detail of a portion of the machine at the discharging end thereof; Fig. 4, a view of the same at right angles to Fig. 3, with other parts added; Fig. 5, an end view of the device, as in Figs. 1 and 2, with parts broken away and the feeding mechanism in section on the line *b b* of Fig. 1.

Like letters refer to like parts in all the figures.

A is the hopper, in which the dry stock is placed. C is a tubular extension of said hopper.

C' is a feed-screw, which determines the quantity of stock and feeds the same into the spout T, to which is connected the pipe B to supply the requisite amount of liquid.

C'' is a mixing-chamber, in which rotates the mixer C''', which stirs the stock and liquid, forming them into a paste.

C'''' is a slit, through which the paste overflows upon the inclined inner surface D of the casing D', which is open at the bottom, provided with a packing D'' to retain the paste, and is supported in contact with the molds E, which are provided with chambers in their adjacent surfaces to receive the paste, and also with cogs E' at each end, with which engage the gears L, which impart a continuous movement to said molds. Said gears are mounted upon shafts K''', provided with means of simultaneous rotation, consisting of bevel-gears P, shaft K'', worm-gear O, shaft K', bevel-gears P', and driving-shaft K. Any other suitable mechanism may be used to synchronously rotate said gears L that may be most convenient. Said molds are also each connected to endless chains V, having laterally-slotted links V' by means of screws W, which traverse said slots to permit said molds to move vertically upon each other as they pass successively under and over the rolls G and G', which rolls are journaled to the frame of the machine alternately above and below, and projecting within the plane of said molds. Said chain V serves to form said molds into a connected series or endless band, which extends horizontally around two polygonal rolls F, having faces corresponding in area to the base of each mold E, and with which faces said molds are successively brought in contact as they proceed. Said chain is also provided with a little lost motion or clearance in its joints to permit the molds to be crowded into close contact while filled, and slightly separated while returning empty. Said molds while filled are also kept in line by projecting ribs X X on the sides of the frame, which are parallel, and between which said molds are accurately fitted.

N is a table to support the molds in line and take their weight off the chains V.

H is a concave plate, to prevent too early discharge of the contents of the molds, and H' corrugated bars attached thereto, which are adjusted to contact the molds and vibrate the same.

I is a tank, having a cover I' and inclosing the lower or returning portion of the molds and chain V, which latter runs on ways I'', attached to the sides of the tank, said chain supporting the molds in an inverted position and carrying them in succession over the pipe J', which is perforated with a series of holes corresponding to the various cavities in said molds and connected to a pump J in the bottom of the tank, which pump is supplied with suitable oil or other liquid for washing and lubricating said molds, said pump being actuated by the driving-shaft and so moved that it will discharge a spray of oil through the openings in the pipe J' as each series of openings in the molds passes over said pipe. The oil or other liquid is placed in the tank I, which is provided with a screen I''' to prevent any solid particles of stock washed from the molds from passing into the pump.

The screw C' and mixer C''' are connected by sprocket-wheels and chain U and driven by cone-pulleys Q Q' and belt R. Any other convenient means of rotating and regulating the speed of said screw and mixer may be adopted that is most convenient.

M represents any convenient carrier for removing the stock from the machine.

The operation of my device is as follows: The dry material is supplied to the hopper A and its passage into the mixer regulated by adjusting the speed of the screw C'. The water or other liquid is turned on at the pipe B and regulated by a stop-cock or otherwise, as convenient. This mixture is stirred and formed into a paste by the mixer C''', which paste overflows at the opening C'''', and spreading over the incline D is distributed to and fills the opening in the molds E, any excess being retained by the casing D, where it can be examined and its consistency and quantity observed. The molds are pressed slowly forward by the gears L together with the resistance due to friction on the table N and the rolls G. Said molds are crowded into close contact with each other and leakage prevented. As they move slowly forward their contents have time to set or harden before reaching the rolls G G', which, imparting a reciprocating sliding motion to said molds, loosens their contents, which will move with the rising mold, and thus be taken away on the rear or upper side of the molds as it rises upon the roll F to make the half-revolution round the same. As the molds are inverted the stock is discharged upon the carrier M. The molds now pass into the cleaning-tank in an inverted position, and the propelling power being in advance the chains are pulled upon and the slack taken up, which slightly separates the molds and allows the spray of oil from the pipe J' to reach all parts of the same, thus releasing any adhering particles of stock, which particles are carried into the tank, whence they can be removed from time to time. As the molds move slowly forward they have ample time to drain, only enough oil adhering to properly lubricate them. As they finally turn around the forward roll F and are inverted thereby, the gears L engage the cogs on the ends of said molds and crowd them forward to again repeat the process.

What we claim is as follows:

1. The combination of a hopper having a tubular extension, a feed-screw in said extension, mechanism adapted to rotate said feed-screw at adjustable speeds, a mixing-chamber having mechanism to stir the contents thereof, means of supplying a constant stream of liquid to said chamber, said chamber having a slit or opening in its side, and a casing attached opposite said opening, substantially as described.

2. In combination, a mixing-chamber provided with means for supplying dry material and liquid in variable quantities and means for mixing and stirring the same, also having a slit or opening, a box opposite said opening, said box open at the bottom, and molds adapted to pass beneath said box, upon which the latter rests, substantially as described.

3. In combination with a series of molds, chains having lateral slotted openings, screws passing through said openings and attached to said molds, rolls around which said molds revolve, and rolls located alternately above and below and projecting within the plane of said molds, substantially as described.

4. In combination with a series of molds, an endless chain to which said molds are attached, forming an endless belt, rolls about which said molds rotate, a concave plate opposite one of said rolls, and a corrugated bar attached thereto and engaging the free sides of said molds, substantially as described.

5. In combination, a series of molds having cogs, gears engaging said cogs and provided with means of rotation, endless chains having lateral slotted openings, screws passing through said openings and attached to said molds, rolls around which said molds rotate, a table between said rolls supporting a portion of said molds, and a series of molds alternately above and below and projecting within the plane of said molds, substantially as described.

6. In combination with molds connected in endless series, rolls around which said molds perform half-revolutions and extending in two lines between said rolls, and a tank inclosing the lower series of said molds and provided with a pump having a pipe attached provided with a series of holes, substantially as described.

7. The combination of molds connected in endless series, two rolls in the same plane, about which said molds semi-rotate and between which said molds move in two lines, mechanism for propelling said molds, a mixer at one end of the upper line of said molds, adapted to fill the same as they pass, mechanism to impart a reciprocating motion to said molds at the opposite end of said upper line of molds, a carrier upon which the contents of said molds are discharged, and an oil-reservoir inclosing the lower line of said molds and provided with a pump and spray-pipe, substantially as described.

In testimony whereof we affix our signatures in presence of witnesses.

JAMES QUINN, JR.
LUTHER V. MOULTON.

Witnesses:
DENNIS L. ROGERS,
GEORGE W. SHOOK,
E. W. GARRETSON,
F. H. LANCASTER.